United States Patent Office 3,456,616
Patented July 22, 1969

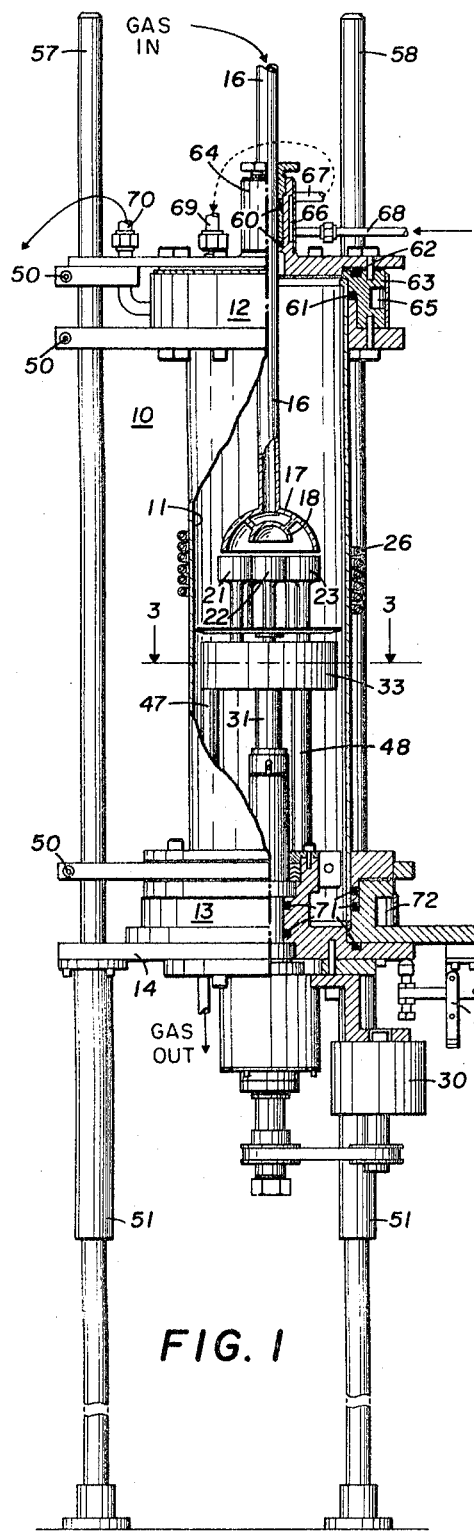

3,456,616
VAPOR DEPOSITION APPARATUS INCLUDING
ORBITAL SUBSTRATE SUPPORT
Paul S. Gleim, Dallas, and Jimmie B. Sherer, Garland,
Tex., assignors to Texas Instruments Incorporated,
Dallas, Tex., a corporation of Delaware
Continuation of application Ser. No. 511,881, Dec. 6,
1965. This application May 8, 1968, Ser. No. 727,744
Int. Cl. C23c 13/04, 13/12
U.S. Cl. 118—49.5                              5 Claims

ABSTRACT OF THE DISCLOSURE

An apparatus for epitaxial growth wherein the bottom closure of the reaction chamber is vertically displacable for substrate loading purposes and said closure supports a planetary gear system whereby a plurality of rotating substrate supports may be orbited.

This invention relates to production of semiconductor bodies having at least one epitaxial layer of a semiconductor material, and, more particularly, to an epitaxial reactor system.

The growth on semiconductor bodies by epitaxial techniques is well known. In use, it has been found that the thickness and resistivity of an epitaxial layer may be reactor dependent. Similarly, the concentration gradient of the substrate-epitaxial interface may be reactor dependent. It is highly desirable that the thickness and resistivity, as well as such gradient, be uniform. The present invention is directed to a method and system for minimizing variations in the above-mentioned parameters.

The gaseous flow pattern in a reactor is characteristic of the given reactor design. In prior art reactors, the substrate has been supported in the reactor in a fixed position. In other reactors, the substrate has been rotated in an effort to reduce variations in the critical parameters.

The present invention is directed to an improvement over such prior art reactors in that the flow pattern is optimized and, at the same time, the substrate is mounted for rotation while orbiting through the gas flow pattern, whereby variations in any general characteristic of the reactor or its flow pattern will be substantially compensated, thus avoiding the variations in thickness and minimizing the tendency for resistivity of the layer to be higher on the leading edge relative to the flow pattern. Also avoided is the variation from a sharp to a graded concentration gradient in the substrate-epitaxial interface in going from the leading edge to the trailing edge.

In accordance with the invention, a system is provided for support of a semiconductor substrate. The system includes a pedestal having a top surface to support the substrate. Means are provided for rotating the pedestal on its axis and for orbiting the pedestal while undergoing such rotation. Means are then provided for directing a substantially uniform downward flow of a gas mixture through the entire zone through which the substrate passes in its orbit. An induction heater is provided for maintaining the pedestal and the substrate at a predetermined temperature for growth of an epitaxial layer on the substrate from constituents of the gas.

For a more complete understanding of the present invention and for further objects and advantages thereof, reference may now be had to the following description taken in conjunction with the accompanying drawings in which:

FIGURE 1 is a plan view, partially in section, illustrating one embodiment of the present invention;

FIGURE 2 is an osometric view illustrating the pedestal drive system; and

FIGURE 3 is a partial sectional view taken along lines 3—3 of FIGURE 1.

Referring now to FIGURE 1, a reactor 10 is provided for epitaxial growth on a crystal surface of a material, the constituents of which are supplied from a gaseous source. The reactor is encased in a quartz tube 11 which is sealed at the top by a cap 12 and at the bottom by a fixed cap 13 and a movable plate 14. Gas is delivered into the reactor by way of a central tube 16 which passes through cap 12 and has a conical or hemispherical distributor 17. An internal deflector 18 is supported inside distributor 17. Gas flow preferably is in an annular pattern directed downwardly to impinge the surface of semiconductor wafers 21a–25a supported on five pedestals 21–25, only pedestals 21–23 being shown in FIGURE 1. The pedestals are heated by an induction coil 26 encircling the tube 11.

The present invention is particularly directed to control of the contact between the gas stream and semiconductor wafers supported on pedestals 21–25. In accordance with the present invention, structure is provided such that the pedestals 21–25 are driven in an orbit around the axis of the tube 16. At the same time, each of the pedestals 21–25 is rotated on its own axis so that growth of an epitaxial layer of controlled character over the entire surface of each wafer will be assured.

The structure for producing the motion above noted, and as shown in FIGURES 1–3, involves the use of a motor 30 which drives a central shaft 31. Shaft 31 drives a sun gear 32 mounted at the axis of the reactor. The pedestals 21–25 are supported by planetary gears 41–45. Planetary gears 41–45 are enmeshed with sun gear 32 and with a ring gear 33. Ring gear 33 is supported on and above plate 14 by legs 47 and 48. As best shown in FIGURE 2, the gears are protected by a pair of shields 32a and 33a. The shields protect the gears from any material which may flake off from the pedestals or the supporting shafts. This aids in maintaining smooth operation. Thus, by driving the shaft 31, the pedestals 21–25 are moved in an orbit and while moving in such orbit, rotate on their own axes. Shafts 36–40 support the pedestals 21–25 above the planetary gears 41–45, respectively.

Preferably, the pedestals and gears are made out of graphite. The pedestals may be of any suitable material which will permit them to be coupled to the inductive heating coil. They may be made from molybdenum or other such material capable of tolerating the temperatures involved but which will not introduce unwanted impurities into the reactor.

The shafts 36–40 preferably are of quartz. Stainless steel has also been found to be satisfactory for this purpose.

In the embodiment illustrated, the reactor 10 is supported on three legs, two of which, the legs 57 and 58, are shown in FIGURE 1. Caps 12 and 13 have perforated and slotted ears, by means of which they are clamped to the legs 57 and 58 by action of screws 50. Thus, cap 12, tube 11, induction coil 26, and lower cap 13 are clamped in fixed position. In contrast, pedestals 21–25, shaft 31, planetary gears 41–45, sun gear 32, and ring gear 33 are all supported from the plate 14 which is slidable along legs 57 and 58 so that the pedestals can be lowered to a point below cap 13 to facilitate loading and unloading of wafers to be processed in the reactor.

Tubes 51 are fastened to the plate 14 and slide over the legs 57 and 58, coming to rest when the plate 14 is lowered to position the tops of the pedestals below cap 13. A plurality of clamping mechanisms, such as the clamp 52, are employed to clamp plate 14, carrying the pedestals and the drive and supporting portions of the system in place when the reactor is in operation. A conventional counterweight system (not shown) may be included in order to ease the operation of loading or unloading the reactor.

It will be appreciated that heat from the induction coil will penetrate the entire reactor. Even with the tendency to heat up, a plurality of sealing elements are maintained in the reactor so that only specified gas constituents will contact any semiconductor wafer in the reactor when it is heated.

The reactor is sealed by means of packing glands. Two O-rings 60 form a seal around the tube 16 passing through the cap 12. O-rings 61 form a seal around the upper end of the tube 11. O-ring 62 seals the lower half 63 of cap 12 from the upper half 64. In order to protect O-rings 60–62 from excessive heat, the cap 12 is water-cooled. For this purpose, a pair of water courses 65 and 66 are formed in cap members 63 and 64, respectively. Cooling water may then be channeled from a supply line 67 through water course 66. The effluent from course 66 may then be channeled from line 68 to line 69 which leads to the course 65. The effluent from course 65 may then be channeled from the output line 70 to waste, if desired. In a similar manner, the lower end of the system is maintained gas-tight by O-rings 71. The lower cap 13 and shaft 31 are water-cooled by a flow of water through the water course 72.

While induction heating is preferred, heating may also be carried out by other means such as a resistance heater which, by radiation, serves to elevate the reactor temperature. Such a system, in general, is well known and may generally be of the type illustrtaed in Silicon Semiconductor Technology, McGraw-Hill (1965), FIGS. 4–8, page 33.

With the system thus described, uniformity of thickness and resistivity of an epitaxial layer may be made to be substantially independent of the gas flow pattern. Further, the concentration gradient of the substrate-epitaxial interface is maintained uniform. Uniformity in concentration gradient is due primarily to elimination of autodoping, a phenomenon which has been characteristic of prior reactors when the gas flow passes successively over more than one wafer. The flow preferably is annular where it impinges wafers 21a–25a as they lay on the pedestals 21–25. The planetary motion, for all practical purposes, lets the substrate experience the effect of all flow patterns in the reactor and avoids fixed position effects. Gas flow may be exhausted through the bottom plate 14.

In the use of the system for selective vapor etching and redepositing, as used in the dielectric isolation for semi-conductor network fabrication, it has been found to be important to have very uniform etch depths through silicon dioxide windows across the slice. Further, epitaxial deposits into such windows must be of uniform thickness across the slice. The present invention has been found to achieve excellent results in this application.

In use of the invention, for a deposition rate of the order of one micron per minute on a germanium substrate, gas flow of about 0.2% germanium tetrachloride ($GeCl_4$) plus hydrogen flowing at the rate of 14 liters per minute has been found to be satisfactory. In such case, the rotation of each pedestal in its orbit was about 5 r.p.m. The rotation of the sun gear was about 17 r.p.m. The rotation of each pedestal on its axis was about 18 r.p.m. The temperature of the pedestal, as measured by an optical pyrometer (emissivity uncorrected), was about 820° C. so that the true temperature was of the order of 850° to 860° C. For work on silicon, of course, the temperature would be elevated even further. This system has been operated at temperatures up to 1400° C.

A thermally decomposable gas containing a film-building constituent as employed in the reactor has been described as a hydrogen carrier containing germanium tetrachloride. When necessary, a dopant such as di-borane may be included. In operations involving silicon, a suitable halide of silicon could be employed. Further, the reactor may be employed to grow a molybdenum layer on a semiconductor or ceramic substrate. In such cases, the gas could comprise molybdenum pentachloride ($MoCl_5$) in a hydrogen carrier. Thus, the reactor may be employed for producing a wide variety of end products and will be used to advantage in any case where uniformity of film dimension, constituent concentration and film-substrate gradient are essential.

In accordance with the invention, a reactor is provided in which one or more pedestals are mounted for support of wafers on which epitaxial layers are to be grown. Means are provided for rotating each pedestal on its axis and for orbiting the pedestals in an array while under rotation. The reactor includes structure for confining and directing flow of a thermally decomposable gas containing a film-building constituent through the zone of orbit of the pedestals. Preferably, the gas flow is annular and is directed downward to contact the surface of any wafer on a given pedestal. However, gas may be introduced other than axially or through the top of the reactor in order to supply the necessary film-building constituents. Regardless of the particular flow pattern, the pedestals will be rotated on their own axes and orbited as to minimize the effect of any variation in the gas flow pattern throughout the reactor. Means are provided for heating the pedestals and wafers to a temperature for growth of an epitaxial layer from the constituents in the gas.

What is claimed is:

1. A system for growing epitaxial layers on semiconductor wafers which comprises:
    (a) a reactor housing including an elongated tubular member having a top closure cap and a severable bottom closure cap of a first portion and a second portion, said first portion engaging the lower end of said tubular member in sealing relationship,
    (b) a frame for supporting said top closure cap and said first portion of said bottom closure cap in fixed position with said tubular member being vertical,
    (c) slide means for moving said second portion of said bottom cap downward below the bottom of said tubular member,
    (d) a shaft passing through said second portion axially of said tubular member and having a sun gear thereon, a ring gear supported in fixed position from and above said second portion so as to confront said sun gear, a plurality of planetary gears engaging both said sun gear and said ring gear, a plurality of pedestals mounted respectively on said planetary gears having planar tops, whereby said wafers are supported thereon,
    (e) drive means mounted on said second portion for driving said shaft, effecting simultaneous rotation of said pedestals on their own axes and orbiting of said pedestals relative to the axis of said tubular member,
    (f) structure supported by said top cap forming a channel and annular passageway therein, whereby a gas having at least one film-building constituent can be passed downwardly through the orbit of said pedestals,
    (g) means for heating said pedestals and any wafers thereon, whereby a layer can be grown on said wafers from said at least one constituent in said gas, and
    (h) structure for exhaust of said gas through said second portion of said bottom cap.

2. The combination set forth in claim 1 in which O-rings seal said cylinder to said top cap and said bottom cap and wherein structure is provided for flow of coolant through said top cap and said bottom cap to protect said O-rings.

3. The combination set forth in claim 1 in which a controlled source of a gas having a film-building constituent therein is connected to said channel.

4. The combination set forth in claim 1 in which said tubular member is a cylinder and in which O-rings in said top cap and said bottom cap provide a gas-tight seal to said cylinder, wherein said top cap and said bottom cap are provided with flow channels for coolant flow therein, wherein the portions of said bottom cap are adapted to be sealed in gas-tight relation, and wherein clamping means is provided for securing the portions of said bottom cap one to the other.

5. A system for growing epitaxial layers on semiconductor wafers which comprises:

(a) a reactor housing including an elongated tube having a top closure cap, and a bottom closure cap including a ring which is clamped to a frame defined in (b) and which engages the lower end of said tube in sealing relationship and a plate slidable along said frame and adapted to be clamped and sealed to said ring, (b) a frame for supporting said top closure cap and one portion of said bottom closure cap in fixed position with said tube held vertically, (c) slide means for moving said plate portion of said bottom cap downward below the bottom of said tube, (d) a ring gear supported on and above said plate, (e) a driven shaft having a sun gear thereon, passing through said plate axially of said tube, said shaft supporting said sun gear concentrically within said ring gear, (f) a plurality of planetary gears intermediate between and meshing with said sun gear and said ring gear and supporting, respectively, a plurality of pedestals defined in (g), whereby on the rotation of said sun gear movement of said planetary gears in an orbit within said ring gear and rotation about their own axes is effected, (g) a plurality of pedestals respectively supported on and fixed to said planetary gears to undergo similar movement, said pedestals having a planar top for supporting said wafers thereon, (h) a pair of shields covering said sun gear and said ring gear, (i) a central tube passing through said top cap and containing a distributor outlet having a deflector of either conical or hemispherical shape concentrically therewithin for providing annular flow of a gas having at least one film-building constituent downwardly through the orbit of said pedestals, and (j) means for heating said pedestals and said wafers thereon to grow a uniform epitaxial layer of said at least one constituent from said gas on said wafers.

References Cited

UNITED STATES PATENTS

| | | | |
|---|---|---|---|
| 2,586,438 | 2/1952 | Kuebler | 118—48 |
| 2,724,663 | 11/1955 | Bond | 118—49 X |
| 2,764,956 | 10/1956 | Burnett et al. | 118—323 X |
| 3,011,877 | 12/1961 | Schweickert et al. | 118—49.5 X |
| 3,128,205 | 4/1964 | Illsley | 118—49 |
| 3,211,128 | 10/1965 | Potter et al. | 118—49.1 |
| 3,233,578 | 2/1966 | Capita | 117—106.4 |
| 3,286,685 | 11/1966 | Sandmann et al. | 118—49.1 |
| 3,301,213 | 1/1967 | Grochowski et al. | 118—48 |

MORRIS KAPLAN, Primary Examiner